United States Patent
Kim

(10) Patent No.: US 7,868,499 B2
(45) Date of Patent: Jan. 11, 2011

(54) SPINDLE MOTOR HAVING PLURALITY OF SEALING PORTIONS

(75) Inventor: Duck Young Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 737 days.

(21) Appl. No.: 11/701,534

(22) Filed: Feb. 2, 2007

(65) Prior Publication Data
US 2007/0206890 A1    Sep. 6, 2007

(30) Foreign Application Priority Data
Feb. 2, 2006    (KR)    ..................... 10-2006-0010211

(51) Int. Cl.
*H02K 5/16* (2006.01)
*H02K 7/08* (2006.01)

(52) U.S. Cl. ......................................... 310/90; 384/119
(58) Field of Classification Search .................... 310/90
See application file for complete search history.

(56) References Cited

U.S. PATENT DOCUMENTS

| | | | |
|---|---|---|---|
| 5,658,080 A * | 8/1997 | Ichiyama | 384/112 |
| 5,822,846 A * | 10/1998 | Moritan et al. | 29/598 |
| 2002/0093261 A1 * | 7/2002 | Goto et al. | 310/90 |
| 2002/0175577 A1 * | 11/2002 | Yoshitsugu et al. | 310/90 |
| 2003/0161559 A1 * | 8/2003 | Kurobe et al. | 384/119 |
| 2003/0174915 A1 * | 9/2003 | Parsoneault et al. | 384/110 |
| 2003/0230944 A1 * | 12/2003 | Aiello | 310/90.5 |
| 2004/0000825 A1 * | 1/2004 | Hirose et al. | 310/90 |
| 2004/0032175 A1 * | 2/2004 | Grantz et al. | 310/90 |
| 2004/0061394 A1 * | 4/2004 | Gotoh et al. | 310/90 |
| 2004/0091187 A1 * | 5/2004 | Aiello et al. | 384/112 |
| 2004/0239197 A1 * | 12/2004 | Tsuchiya | 310/90 |
| 2004/0247213 A1 * | 12/2004 | Dittmer et al. | 384/132 |

(Continued)

FOREIGN PATENT DOCUMENTS

CN    1614249 A    5/2005

(Continued)

OTHER PUBLICATIONS

Chinese Office Action issued on Feb. 27, 2009 in corresponding Chinese Patent Application 2007100075366.

(Continued)

*Primary Examiner*—Quyen Leung
*Assistant Examiner*—Alex W Mok

(57) ABSTRACT

Disclosed herein is a spindle motor having a plurality of sealing portions. The spindle motor includes a rotor hub for rotating a recording medium mounted thereon, a rotating shaft secured to the rotor hub and supporting the rotor hub, a sleeve for rotatably supporting the rotating shaft, and a sealing member. The sealing member is secured to the sleeve and coupled to a bearing portion between the rotating shaft and the sleeve, and provides a rotary side sealing portion and a stationary side sealing portion between the rotor hub and the sleeve. The rotor hub has a ring-shaped inner wall facing the sealing member. The sealing member has a shape of a hollow cylinder, at least part of an outer circumferential surface of the sealing member facing the ring-shaped inner wall and at least part of an inner circumferential surface of the sealing member facing the sleeve being inclined and thus gradually tapered.

10 Claims, 7 Drawing Sheets

U.S. PATENT DOCUMENTS

| | | | |
|---|---|---|---|
| 2005/0074191 A1* | 4/2005 | Braun et al. | 384/100 |
| 2005/0084189 A1* | 4/2005 | Oelsch | 384/107 |
| 2005/0162027 A1* | 7/2005 | Aiello et al. | 310/90 |
| 2005/0286820 A1* | 12/2005 | Grantz et al. | 384/119 |
| 2006/0126979 A1* | 6/2006 | Uenosono et al. | 384/100 |
| 2006/0170300 A1* | 8/2006 | Kodama | 310/90 |
| 2006/0244326 A1* | 11/2006 | Tamaoka | 310/90 |
| 2006/0274448 A1* | 12/2006 | Asada et al. | 360/99.08 |
| 2007/0013249 A1* | 1/2007 | Engesser et al. | 310/90 |

FOREIGN PATENT DOCUMENTS

| | | |
|---|---|---|
| JP | 2002-54628 | 2/2002 |
| JP | 2002-165407 | 6/2002 |
| JP | 2005-269894 | 9/2005 |
| JP | 2006-501795 | 1/2006 |

OTHER PUBLICATIONS

Japanese Office Action dated Nov. 19, 2009 and issued in corresponding Japanese Patent Application 2007-024378.

* cited by examiner

SPINDLE MOTOR HAVING PLURALITY OF SEALING PORTIONS

CROSS REFERENCE TO RELATED APPLICATION(S)

This application claims the benefit of Korean Patent Application No. 10-2006-0010211, filed on Feb. 2, 2006, entitled "spindle motor having plurality of sealing portions", which is hereby incorporated by reference in its entirety into this application.

BACKGROUND OF THE INVENTION

1. Field of the Invention

The present invention relates generally to a spindle motor and, more particularly, to a spindle motor having a plurality of sealing portions, having improved ability to seal fluid into a bearing portion, and enabling the storage of a larger amount of fluid.

2. Description of the Related Art

A spindle motor has a hydrodynamic bearing therein to generate dynamic pressure, and is installed in a hard disk drive or the like. Recently, as the spindle motor is applied to a portable product, such as an MP3 player or a mobile phone, attempts to miniaturize the spindle motor have been made. One example of a conventional spindle motor is shown in FIGS. 7 and 8.

As shown in FIGS. 7 and 8, a conventional spindle motor 400 includes a stationary part 401 and a rotary part 405 which is rotatably supported by the stationary part 401.

The stationary part 401 includes a base 410, a sleeve 420, a sealing cap 430, and an armature 440.

The base 410 functions to support respective parts of the stationary part 401, and is usually made of a non-magnetic material, such as aluminum alloy. Further, the base 410 includes a bottom portion 411, a sleeve supporting portion 412, and an outer wall portion 413. The bottom portion 411 has a disk shape, the sleeve supporting portion 412 has the shape of a cylinder which protrudes upwards from the center of the bottom portion 411, and the outer wall portion 413 extends upwards from the outer circumference of the bottom portion 411 to form a wall. Meanwhile, the sleeve 420 is supported by the sleeve supporting portion 412, and the base 410 is secured to a housing (not shown) of a device in which the motor 400 is installed, for example, a hard disk drive.

The sleeve 420 functions to rotatably support the rotary part 405, is made of a metallic material, and has a cylindrical shape. The lower end of the sleeve 420 is press-fitted into the sleeve supporting portion 412. The sleeve 420 is installed such that the central axis thereof corresponds to the central axis of a rotating shaft 470.

The sealing cap 430 has a disk shape, and serves to prevent fluid from leaking out of a bearing portion. The sealing cap 430 is secured to the sleeve 420 to close the lower end of the sleeve 420, thus preventing the leakage of the fluid from the bearing portion.

When external power is applied to the armature 440, the armature 440 forms an electric field. The armature 440 includes a core 441 which is secured to the outer wall of the sleeve supporting portion 412, and a coil 442 which is wound around the core 441.

Meanwhile, the rotary part 405 includes a rotor hub 460, the rotating shaft 470, and a magnet 480.

The rotor hub 460 serves to support respective parts of the rotary part 405, and is made of a magnetic material, such as steel. The rotor hub 460 has a disk portion 461, a cylindrical portion 462, and a disk mounting portion 463.

The rotating shaft 470 is integrally secured to the center of the disk portion 461. The disk portion 461 extends radially from the rotating shaft 470 in a disk shape. The cylindrical portion 462 extends from the outer circumference of the disk portion 461 to the free end of the rotating shaft 470 in a cylindrical shape. Further, the disk mounting portion 463 is the portion on which a recording medium, such as a disk, is mounted, and extends outwards from the outer circumference of the cylindrical portion 462 in a ring shape. Further, an inner wall 464 is mounted to the bottom of the disk portion 461 to be positioned inside the cylindrical portion 462.

The rotating shaft 470 is secured at one end thereof to the disk portion 461, or extends integrally from the disk portion 461, so that the other end of the rotating shaft 470 becomes the free end.

The magnet 480 is installed in the cylindrical portion 462 of the rotor hub 460 such that it is secured thereto and faces the armature 440.

In the motor 400 constructed as described above, a space S1 between the outer circumference of the rotating shaft 470 and the inner circumference of the sleeve 420, a space S2 between the bottom surface of the rotating shaft 470 and the upper surface of the sealing cap 430, a space S3 between the bottom surface of the disk portion 461 of the rotor hub 460 and the upper surface of the sleeve 420, and a space S4 between the outer circumference of the sleeve 420 and the inner circumference of the inner wall 464 of the disk portion 461 communicate with each other, and are filled with fluid. Among the spaces, the spaces S1, S2, and S3 serve as the bearing portion when the rotary part 405 is rotated. Especially in the space S4 is formed a sealing surface, so that the space S4 serves as the sealing portion.

However, in the conventional motor 400 constructed as described above, the sealing portion, in which the sealing surface of the fluid is formed, is provided between the rotary part 405, specifically, the inner circumference of the inner wall 464 of the rotor hub 460, and the stationary part 401, specifically, the outer circumference of the sleeve 420. Thus, when the rotary part 405 is rotated, as shown in detail in FIG. 8, the fluid is driven to the inner wall 464 of the rotor hub 460 by centrifugal force, so that the fluid may undesirably leak out.

SUMMARY OF THE INVENTION

Accordingly, the present invention has been made keeping in mind the above problems occurring in the prior art, and an object of the present invention is to provide a spindle motor having a plurality of sealing portions, in which sealing portions each having a sealing surface are formed between a rotary part and a stationary part, or are formed in the stationary part, so that fluid present in a rotary side sealing portion between the rotary part and the stationary part flows to a stationary side sealing portion in the stationary part when the rotary part is rotated, thus preventing the leakage of the fluid, therefore retaining a larger amount of fluid.

In order to accomplish the above object, the present invention provides a spindle motor having a plurality of sealing portions, which includes a rotary part for rotating a recording medium mounted thereon, a stationary part for rotatably supporting the rotary part, and a sealing member secured to the stationary part to be coupled to a bearing portion between the rotary part and the stationary part, and providing a rotary side sealing portion and a stationary side sealing portion between the rotary part and the stationary part.

In this case, fluid stored in the rotary side sealing portion flows to the stationary side sealing portion when the rotary part is rotated.

Further, the rotary part or the sealing member has a fluid pumping groove for pumping the fluid to the stationary side sealing portion.

In order to accomplish the above object, the present invention provides a spindle motor having a plurality of sealing portions, which includes a rotor hub for rotating a recording medium mounted thereon, a rotating shaft secured to the rotor hub, and supporting the rotor hub, a sleeve for rotatably supporting the rotating shaft, and a sealing member secured to the sleeve and coupled to a bearing portion between the rotating shaft and the sleeve, and providing a rotary side sealing portion and a stationary side sealing portion between the rotor hub and the sleeve.

The rotor hub has a ring-shaped inner wall facing the sealing member.

Further, the sealing member has a shape of a hollow cylinder, at least part of an outer circumferential surface of the sealing member facing the ring-shaped inner wall and at least part of an inner circumferential surface of the sealing member facing the sleeve being inclined and thus gradually tapered.

Further, fluid stored in the rotary side sealing portion flows to the stationary side sealing portion when the rotor hub is rotated.

Further, the rotor hub or the sealing member has a fluid pumping groove for pumping the fluid to the stationary side sealing portion.

In order to accomplish the above object, the present invention provides a spindle motor having a plurality of sealing portions, which includes a rotor hub for rotating a recording medium mounted thereon, a rotating shaft secured to the rotor hub, and supporting the rotor hub, a sleeve for rotatably supporting the rotating shaft, and a sealing member secured to the sleeve and coupled to a bearing portion between the rotating shaft and the sleeve, and providing a rotary side sealing portion and a stationary side sealing portion between the rotating shaft and the sleeve.

The sealing member has a shape of a hollow container comprising a bottom portion and an erect portion extending from an outer circumference of the bottom portion, at least part of the erect portion facing the sleeve being inclined and thus gradually tapered.

Further, fluid stored in the rotary side sealing portion flows to the stationary side sealing portion when the rotor hub is rotated.

Further, the sleeve or the sealing member has a fluid pumping groove for pumping the fluid to the stationary side sealing portion.

In order to accomplish the above object, the present invention provides a spindle motor having a plurality of sealing portions, which includes a rotor hub for rotating a recording medium mounted thereon, a rotating shaft secured to the rotor hub, and supporting the rotor hub, a sleeve for rotatably supporting the rotating shaft, a ring-shaped intermediate member installed between the rotor hub and the sleeve, and a sealing member secured to the sleeve to be coupled to a bearing portion between the rotating shaft and the sleeve, and providing a rotary side sealing portion and a stationary side sealing portion between the intermediate member and the sleeve.

The sealing member has a shape of a hollow container comprising a bottom portion and an erect portion extending from an outer circumference of the bottom portion, at least part of the erect portion facing the sleeve is inclined and thus gradually tapered, and the intermediate member has an inclined groove along a circumference of the intermediate member at a position facing the bottom portion of the sealing member to store fluid therein.

Fluid stored in the rotary side sealing portion flows to the stationary side sealing portion when the rotor hub is rotated.

Further, the intermediate member or the sealing member has a fluid pumping groove for pumping the fluid to the stationary side sealing portion.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, spindle motors according to the preferred embodiments of the present invention will be described in detail with reference to the accompanying drawings.

A spindle motor 100 according to an embodiment of the present invention will be described with reference to FIGS. 1, 2A, and 2B.

Figure 1:
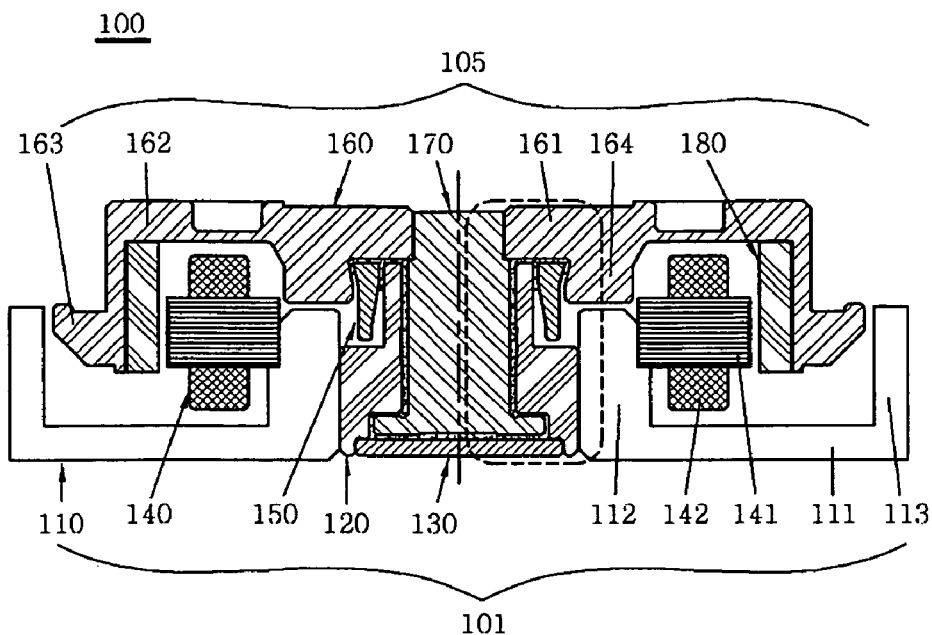
FIG. 1 is a schematic sectional view showing a motor, according to an embodiment of the present invention.
Figure 2A:
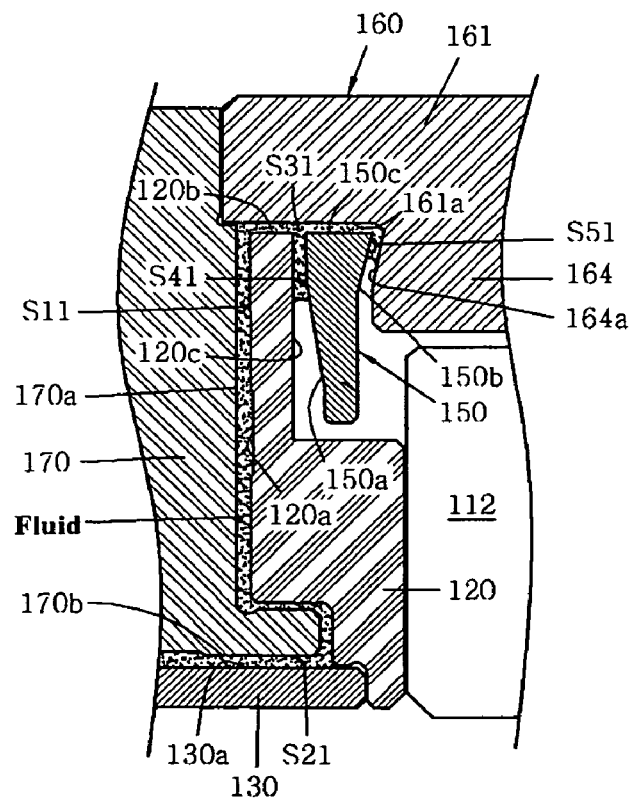
FIGS. 2A and 2B are schematic enlarged sectional views of a portion shown by a dotted line of FIG. 1.
Figure 2B:
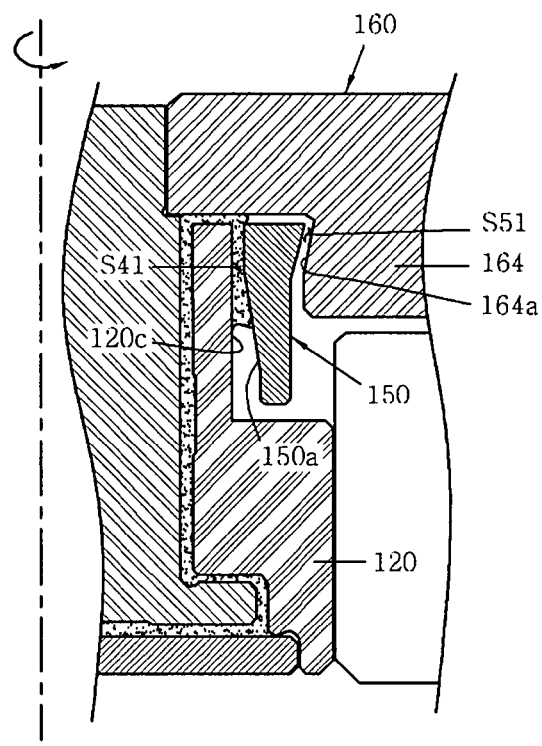

As shown in FIGS. 1, 2A, and 2B, the spindle motor 100 according to this embodiment includes a stationary part 101 and a rotary part 105, which is rotatably supported by the stationary part 101.

The stationary part 101 includes a base 110, a sleeve 120, a sealing cap 130, an armature 140, and a sealing member 150.

The base 110 functions to support respective parts of the stationary part 101, and is made of a non-magnetic material, such as aluminum alloy. Further, the base 110 has a bottom portion 111, a sleeve supporting portion 112, and an outer wall 113. The bottom portion 111 has a disk shape, and the sleeve supporting portion 112 protrudes upwards from the center of the bottom portion 111 and has a cylindrical shape. The outer wall 113 extends upwards from the outer circumference of the bottom portion 111, thus forming a wall. Meanwhile, the sleeve 120 is supported by the sleeve supporting portion 112, and the base 110 is installed so as to be secured to a housing (not shown) of a device in which the motor 100 is installed, for example, a hard disk drive.

The sleeve 120 functions to rotatably support the rotary part 105, is made of a metallic material, and has a cylindrical shape. The lower end of the sleeve 120 is press-fitted into the sleeve supporting portion 112. The sleeve 120 is installed so that the central axis thereof corresponds to the central axis of the rotating shaft 170.

The sealing cap 130 has a disk shape, and serves to prevent fluid from leaking out of a bearing portion. The sealing cap 130 is secured to the sleeve 120 to close the lower end of the sleeve 120, thus preventing the leakage of the fluid from the bearing portion.

When external power is applied to the armature 140, the armature 140 forms an electric field. The armature 140 includes a core 141 which is secured to the outer wall of the sleeve supporting portion 112, and a coil 142 which is wound around the core 141.

The sealing member 150 causes the fluid in the bearing portion to form a sealing surface, thus preventing the fluid from leaking out. The sealing member 150 has the shape of a hollow cylinder and is installed to be secured to the upper end of the outer circumference of the sleeve 120. Further, the sealing member 150 includes an inner circumferential surface 150a which is tapered toward the free end of the sealing member, and an outer circumferential surface 150b, part of which is tapered toward the free end. Thereby, the inner circumferential surface 150a and the outer circumferential surface 150b form a stationary side sealing portion and a rotary side sealing portion, respectively.

Meanwhile, the rotary part 105 includes a rotor hub 160, the rotating shaft 170, and a magnet 180.

The rotor hub 160 serves to support respective parts of the rotary part 105, and is made of a magnetic material, such as steel. The rotor hub 160 has a disk portion 161, a cylindrical portion 162, and a disk mounting portion 163.

The rotating shaft 170 is integrally secured to the center of the disk portion 161. The disk portion 161 extends radially from the rotating shaft 170 and has a disk shape. The cylindrical portion 162 extends from the outer circumference of the disk portion 161 to the free end of the rotating shaft 170 and has a cylindrical shape. Further, the disk mounting portion 163 is the portion on which a recording medium, such as a disk, is mounted, extends outwards from the outer circumference of the cylindrical portion 162, and has a ring shape. Further, an inner wall 164 is mounted to the bottom of the disk portion 161 to be positioned inside the cylindrical portion 162.

The rotating shaft 170 is secured at one end thereof to the disk portion 161, or extends integrally from the disk portion 161, so that the other end of the rotating shaft 170 becomes the free end.

The magnet 180 is installed in the cylindrical portion 162 of the rotor hub 160 to be secured thereto and face the armature 140.

In the motor 100 of this embodiment, as shown in detail in FIG. 2A, the space S11 between the outer circumferential surface 170a of the rotating shaft 170 and the inner circumferential surface 120a of the sleeve 120, the space S21 between the bottom surface 170b of the rotating shaft 170 and the upper surface 130a of the sealing cap 130, the space S31 between the bottom surface 161a of the disk portion 161 of the rotor hub 160, the upper surface 120b of the sleeve 120, and the upper surface 150c of the sealing member 150, the space S41 between the outer circumferential surface 120c of the sleeve 120 and the inner circumferential surface 150a of the sealing member 150, and the space S51 between the outer circumferential surface 150b of the sealing member 150 and the inner circumferential surface 164a of the inner wall 164 of the rotor hub 160 communicate with each other, and are filled with a lubricating fluid. Among the spaces, the spaces S11, S21, and S31 serve as a bearing portion when the rotary part 105 is rotated. Further, sealing surfaces are formed in the spaces S41 and S51, so that the spaces S41 and S51 serve as a stationary side sealing portion and a rotary side sealing portion.

In the motor 100 of this embodiment, when the rotary part 105 rotates relative to the stationary part 101, as shown in FIG. 2B in detail, when the rotary part 105, that is, the rotor hub 160, is rotated, fluid present in the rotary side sealing portion, that is, in the space S51 between the inner circumferential surface 164a of the inner wall 164 and the outer circumferential surface 150b of the sealing member 150 flows to the stationary side sealing portion, that is, the space S41 between the outer circumferential surface 120c of the sleeve 120 and the inner circumferential surface 150a of the sealing member 150.

In order for the fluid to smoothly flow from the space S51 serving as the rotary side sealing portion to the space S41 serving as the stationary side sealing portion, a fluid pumping groove may be formed in the bottom surface 161a of the disk portion 161 of the rotor hub 160 or the upper surface 150c of the sealing member 150, which define part of the space S31, thus pumping the fluid to the stationary side sealing portion.

Figure 3:
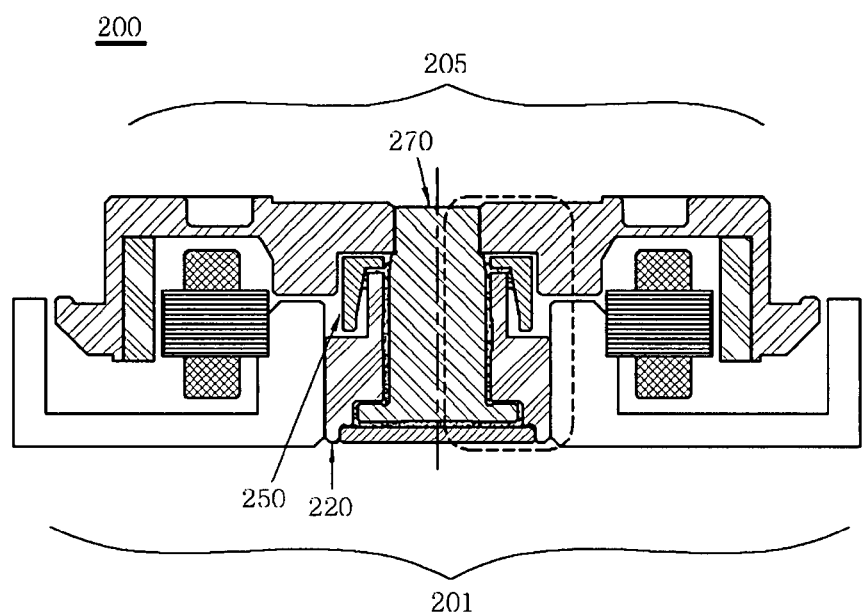
FIG. 3 is a schematic sectional view showing a motor, according to another embodiment of the present invention.
Figure 4A:
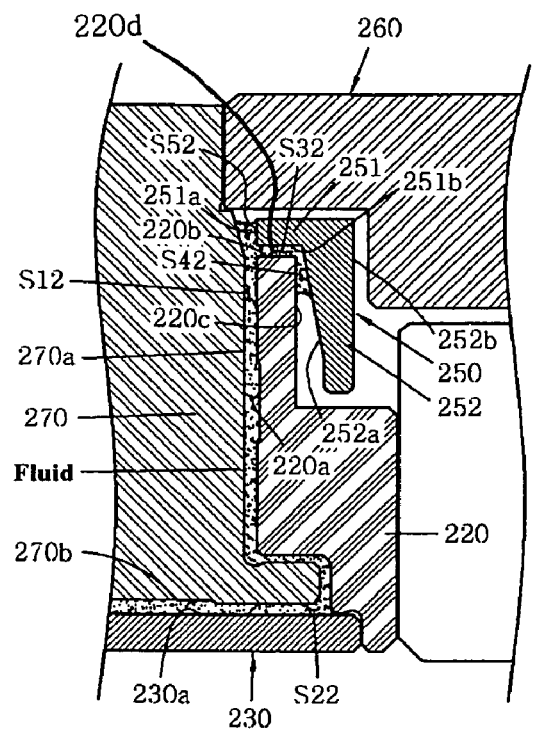
FIGS. 4A and 4B are schematic enlarged sectional views of a portion shown by a dotted line of FIG. 3.
Figure 4B:
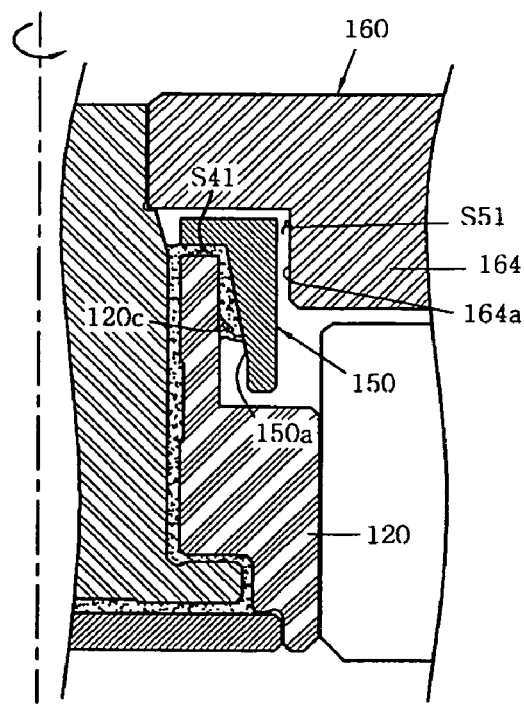

Next, a spindle motor 200 according to another embodiment of the present invention will be described with reference to FIGS. 3, 4A, and 4B. Since the spindle motor 200 of this embodiment is almost to the same as the above-mentioned spindle motor 100 except for part of the sleeve, the shape of the sealing member, and the coupling relation between parts, the description of parts having the same construction will be omitted.

A sealing member 250 includes a bottom portion 251 and an erect portion 252 extending vertically from the outer circumference of the bottom portion 251. The sealing member 250 has the shape of a hollow container having an 'L'-shaped cross-section, and is secured to a sleeve 220. In a detailed description, a side surface 251a and a bottom surface 251b of the bottom portion 251 of the sealing member 250 are secured to the upper surface 220b of the sleeve 220. Further, the erect portion 252 includes an inner circumferential surface 252a which is inclined to be tapered toward the free end of the sealing portion 250, and an outer circumferential surface 252b which extends vertically to the free end.

According to this embodiment, the space S12 between the outer circumferential surface 270a of a rotating shaft 270 and the inner circumferential surface 220a of the sleeve 220, the space S22 between the bottom surface 270b of the rotating shaft 270 and the upper surface 230a of a sealing cap 230, the space S32 between the upper surface 220b of the sleeve 220 and the bottom surface 251b of the bottom portion 251 of the sealing member 250, the space S42 between the outer circumferential surface 220c of the sleeve 220 and the inner circumferential surface 252a of the sealing member 250, and the space S52 between the upper portion of the outer circumferential surface 270a of the rotating shaft 270 and the side surface 251a of the bottom portion 251 of the sealing member 250 communicate with each other, and are filled with a lubricating fluid. Among the spaces, the spaces S12 and S22 serve as a bearing portion when the rotary part 205 is rotated. Further, sealing surfaces are formed in the spaces S42 and S52, so that the spaces S42 and S52 serve as a stationary side sealing portion and a rotary side sealing portion.

In the motor 200 of this embodiment, when the rotary part including rotary hub 260 (see FIG. 4A) rotates relative to the stationary part 201 (see FIG. 3), fluid present in the rotary side sealing portion, that is, in the space S52 between the upper portion of the outer circumferential surface 270a of the rotating shaft 270 and the side surface 251a of the bottom portion 251 of the sealing member 250, flows to the stationary side sealing portion, that is, the space S42 between the outer circumferential surface 220c of the sleeve 220 and the inner circumferential surface 252a of the sealing member 250.

In order for the fluid to smoothly flow from the space S52 serving as the rotary side sealing portion to the space S42 serving as the stationary side sealing portion, a fluid pumping groove 220d may be formed on the upper surface 220b of the sleeve 220 or the bottom surface 251b of the bottom portion 251 of the sealing member 250, which define the space S32, thus pumping the fluid to the stationary side sealing portion.

Figure 5:
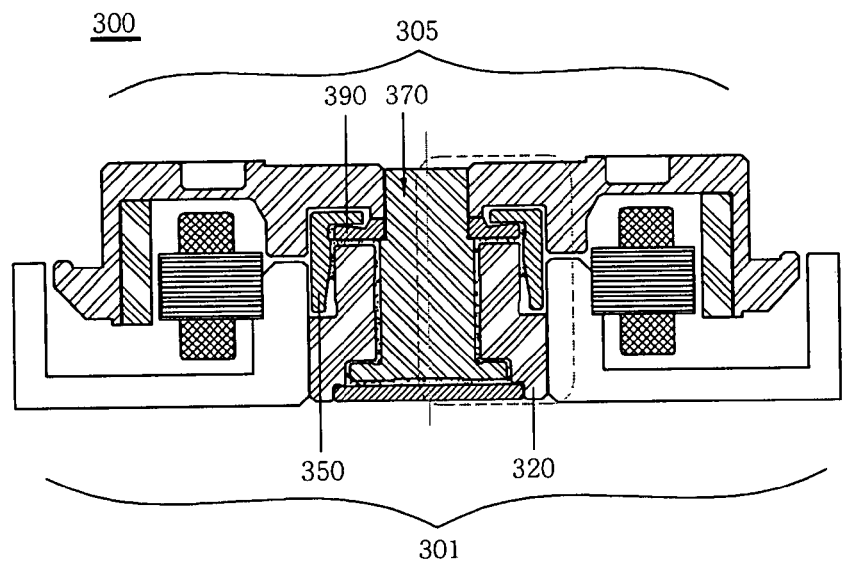
FIG. 5 is a schematic sectional view showing a motor, according to a further embodiment of the present invention.
Figure 6A:
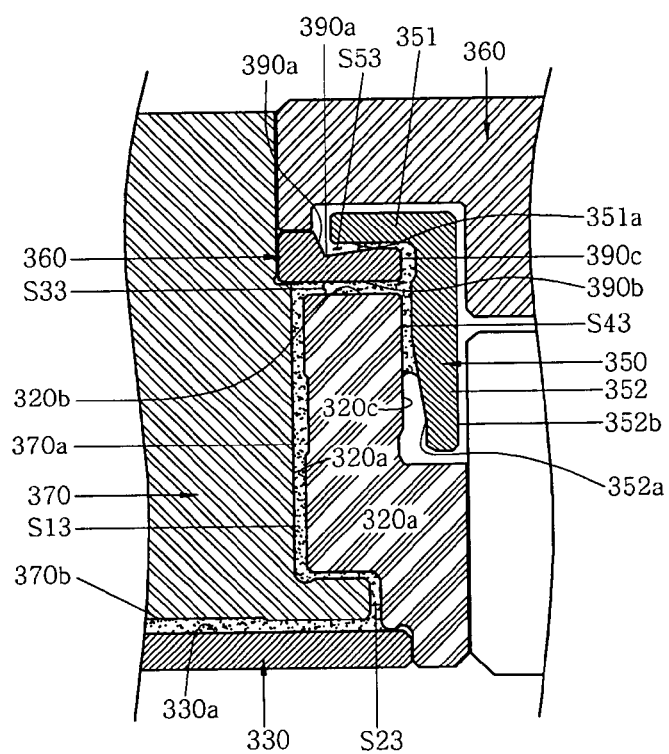
FIGS. 6A and 6B are schematic enlarged sectional views of a portion shown by a dotted line of FIG. 5.

Next, a spindle motor 300 according to a further embodiment of the present invention will be described with reference to FIGS. 5, 6A, and 6B. Since the spindle motor 300 of this embodiment is almost equal to the above-mentioned spindle motor 200 except that an intermediate member is interposed between the sealing member and the sleeve, the description of the same construction will be omitted.

A sealing member 350 includes a bottom portion 351 and an erect portion 352 extending vertically from the outer circumference of the bottom portion 351. The sealing member 350 has the shape of a hollow container having an 'L'-shaped cross-section, and is secured to a sleeve 320 to surround part of an intermediate member 390. Further, the erect portion 352 includes an inner circumferential surface 352a which is inclined at a lower end thereof to be tapered toward a free end of the sealing portion, and an outer circumferential surface 352b which extends vertically to the free end.

The intermediate member 390 has a ring shape, and an inclined groove 391 having an inclined cross-section is formed in the upper surface 390a of the intermediate member 390 along the circumference thereof. Fluid is stored in the inclined groove 391. Further, the intermediate member 390 is secured to a rotating shaft 370 and a rotor hub 360.

According to this embodiment, the space S13 between the outer circumferential surface 370a of the rotating shaft 370 and the inner circumferential surface 320a of the sleeve 320, the space S23 between the bottom surface 370b of the rotating shaft 370 and the upper surface 330a of a sealing cap 330, the space S33 between the upper surface 320b of the sleeve 320 and the bottom surface 390b of the intermediate member 390, the space S43 between the outer circumferential surface 320c of the sleeve 320, the outer circumferential surface 390c of the intermediate member 390, and the inner circumferential surface 352a of the erect portion 352 of the sealing member 350, and the space S53 between the upper surface 390a of the intermediate member 390 and the bottom surface 351a of the bottom portion 351 of the sealing member 350 communicate with each other, and are filled with a lubricating fluid. Among the spaces, the spaces S13 and S23 serve as a bearing portion when a rotary part 305 is rotated against a stationary part 301. Further, sealing surfaces are formed in the spaces S43 and S53, so that the spaces 43 and 53 serve as a stationary side sealing portion and a rotary side sealing portion.

Figure 6B:
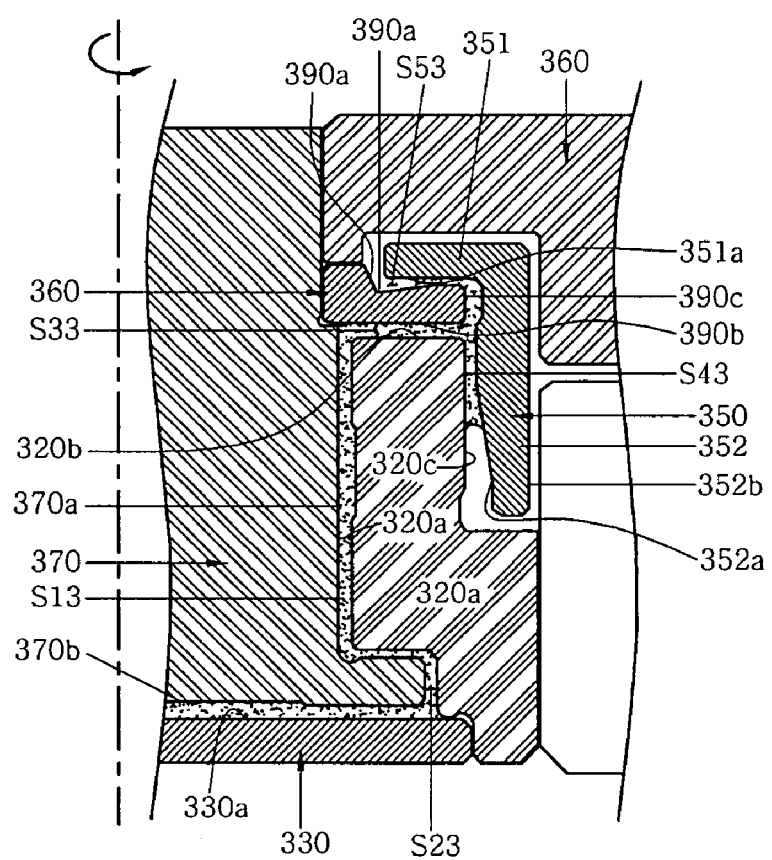
Figure 7:
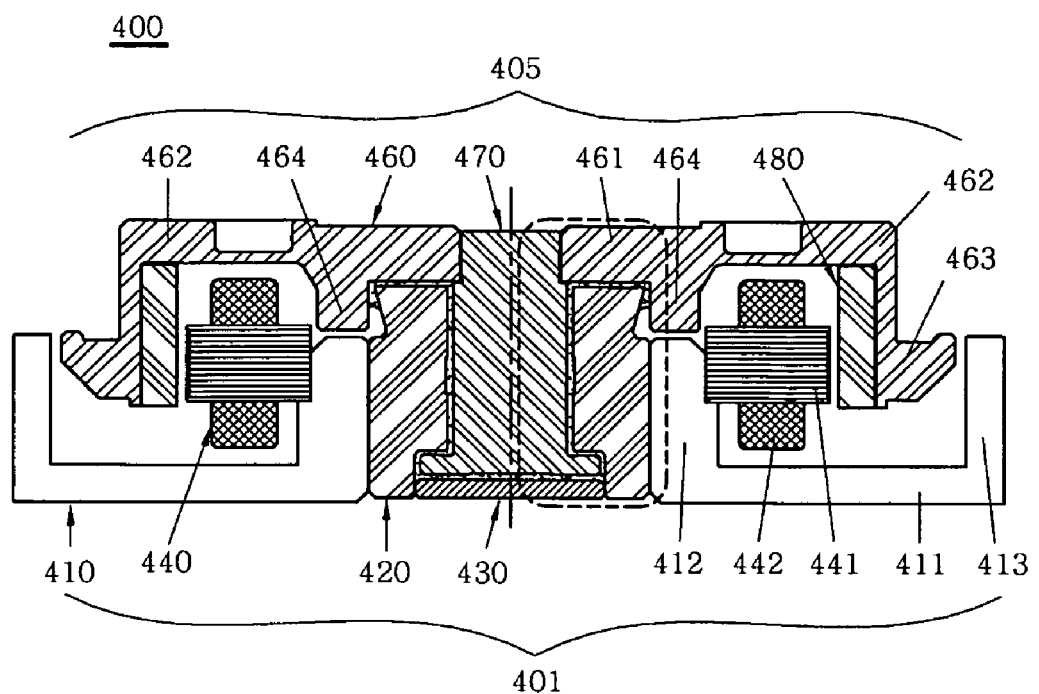
FIG. 7 is a schematic sectional view showing a conventional motor.
Figure 8:
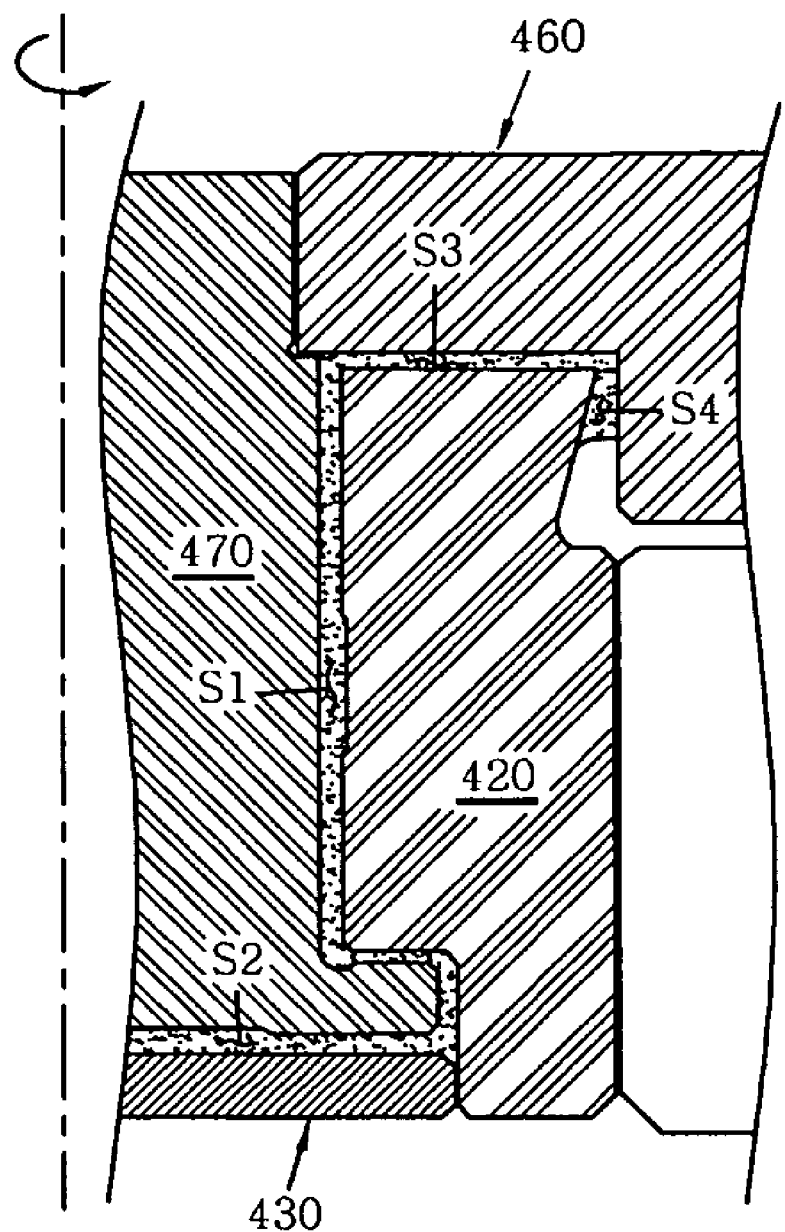
FIG. 8 is a schematic enlarged sectional view of a portion shown by a dotted line of FIG. 7.

In the motor 300 of this embodiment, when the rotary part rotates relative to the stationary part, as shown in FIG. 6B, fluid present in the rotary side sealing portion, that is, the space S53 between the upper surface 390a of the intermediate member 390 and the bottom surface 351a of the bottom portion 351 of the sealing member 350 flows to the stationary side sealing portion, that is, the space S43 between the outer circumferential surface 320c of the sleeve 320, the outer circumferential surface 390c of the intermediate member 390, and the inner circumferential surface 352a of the sealing member 350.

In order for the fluid to smoothly flow from the space S53 serving as the rotary side sealing portion to the space S43 serving as the stationary side sealing portion, a fluid pumping groove (not shown) may be formed in the upper surface 320b of the sleeve 320 or the bottom surface 390b of the intermediate member 390, which define the space S33, thus pumping the fluid to the stationary side sealing portion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a spindle motor, in which a sealing member coupled to a bearing portion between a sleeve of a stationary part and a rotor hub of a rotary part forms a stationary side sealing portion and a rotary side sealing portion at a stationary side and a rotary side, respectively, and fluid flows from the rotary side sealing portion to the stationary side sealing portion when the rotary part is rotated, thus preventing the leakage of the fluid when the rotary part is rotated.

Further, the present invention provides a spindle motor, which has a stationary side sealing portion and a rotary side sealing portion, thus enabling a larger amount of fluid to be stored in a bearing portion, therefore enhancing the performance of the motor even after it has been used for a lengthy period of time, and increasing the life span of the motor.

Further, since the motor can store a larger amount of fluid, the motor is not affected by thermal expansion or thermal contraction caused by the internal fluid.

What is claimed is:

1. A spindle motor having a plurality of sealing portions, comprising:
   a rotary part to rotate a recording medium mounted thereon;
   a stationary part to rotatably supporting the rotary part; and
   a sealing member secured to the stationary part to be coupled to a bearing portion between the rotary part and the stationary part, and to provide a rotary side sealing portion and a stationary side sealing portion to form a sealing surface between the rotary part and the stationary part,
   wherein fluid stored in the rotary side sealing portion flows to the stationary side sealing portion via a space between a bottom surface of the rotary part and an upper surface of the sealing member when the rotary part is rotated.

2. The spindle motor as set forth in claim 1, wherein fluid stored in the rotary side sealing portion flows to the stationary side sealing portion when the rotor hub is rotated.

3. The spindle motor as set forth in claim 2, wherein the sleeve or the sealing member has a fluid pumping groove for pumping the fluid to the stationary side sealing portion.

4. A spindle motor having a plurality of sealing portions, comprising:
   a rotor hub to rotate a recording medium mounted thereon;
   a rotating shaft secured to the rotor hub, and to support the rotor hub;
   a sleeve to rotatably support the rotating shaft; and
   a sealing member secured to the sleeve and coupled to a bearing portion between the rotating shaft and the sleeve, and to provide a rotary side sealing portion between the sleeve and the sealing member, and a stationary side to seal portion between the rotor hub and the sealing member to form a sealing surface.

5. The spindle motor as set forth in claim 4, wherein the rotor hub has a ring-shaped inner wall facing the sealing member.

6. The spindle motor as set forth in claim 5, wherein fluid stored in the rotary side sealing portion flows to the stationary side sealing portion via a space between a bottom surface of the rotor hub and an upper surface of the sealing member when the rotor hub is rotated.

7. The spindle motor as set forth in claim 6, wherein the rotor hub or the sealing member has a fluid pumping groove to pump the fluid to the stationary side sealing portion.

8. The spindle motor as set forth in claim 5, wherein the sealing member has a shape of a hollow cylinder, at least part of an outer circumferential surface of the sealing member facing the ring-shaped inner wall and at least part of an inner circumferential surface of the sealing member facing the sleeve being inclined and thus gradually tapered.

9. The spindle motor as set forth in claim 8, wherein fluid stored in the rotary side sealing portion flows to the stationary side sealing portion when the rotor hub is rotated.

10. The spindle motor as set forth in claim 9, wherein the rotor hub or the sealing member has a fluid pumping groove to pump the fluid to the stationary side sealing portion.

* * * * *